3 Sheets—Sheet 1.

L. VAUGHAN.
VEHICLE DEVICE FOR CHECKING HORSES.

No. 185,990. Patented Jan. 2, 1877.

WITNESSES:
Jas. E. Hutchinson
H. C. Hazard

INVENTOR
Leonard Vaughan, by
Prindle & Co his Attys.

L. VAUGHAN.
VEHICLE DEVICE FOR CHECKING HORSES.

No. 185,990. Patented Jan. 2, 1877.

WITNESSES:
Jas. E. Hutchinson
H. C. Hazard

INVENTOR:
Leonard Vaughan, by
Prindle and his Attys

3 Sheets—Sheet 3.

L. VAUGHAN.
VEHICLE DEVICE FOR CHECKING HORSES.

No. 185,990. Patented Jan. 2, 1877.

WITNESSES:
Jas. C. Hutchinson
H. C. Hazard

INVENTOR:
Leonard Vaughan, by
Prindle and Cox his Attys

N. PETERS, PHOTO-LITHOGRAPHER, WASHINGTON, D. C.

UNITED STATES PATENT OFFICE.

LEONARD VAUGHAN, OF BOSTON, MASSACHUSETTS.

IMPROVEMENT IN VEHICLE DEVICES FOR CHECKING HORSES.

Specification forming part of Letters Patent No. 185,990, dated January 2, 1877; application filed November 24, 1876.

*To all whom it may concern:*

Be it known that I, LEONARD VAUGHAN, of Boston, in the county of Suffolk and State of Massachusetts, have invented certain new and useful Improvements in Apparatus for Fastening Horses; and do hereby declare that the following is a full, clear, and exact description thereof, reference being had to the accompanying drawings, making a part of this specification, in which—

Figure 1:
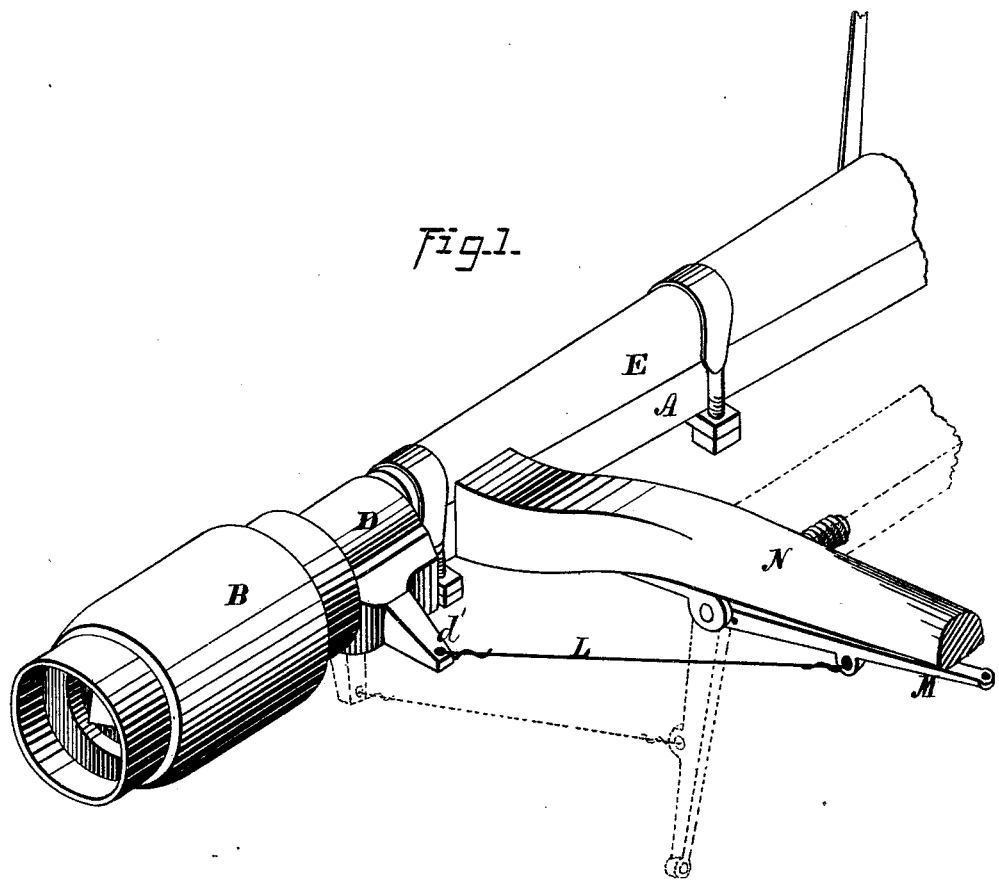
Figure 2:
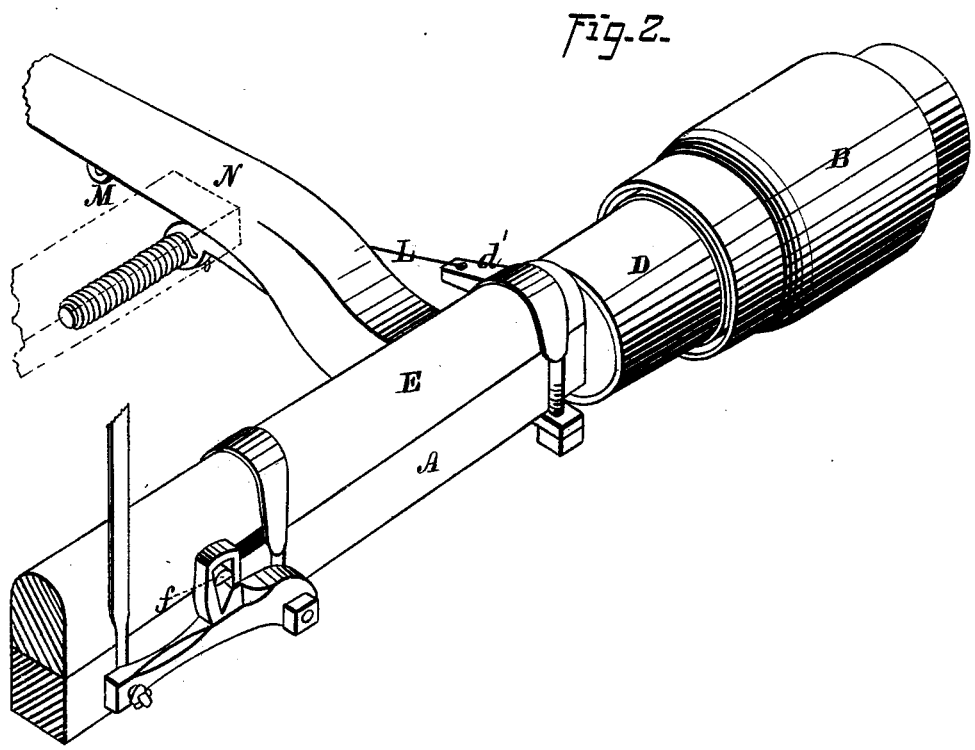
Figure 3:
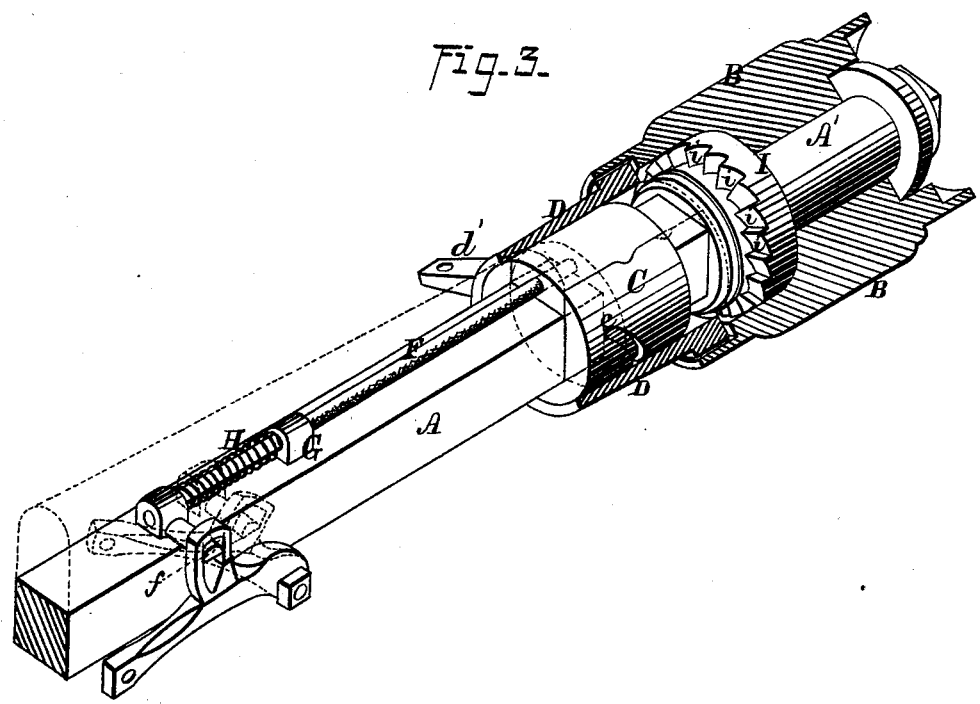
Figure 4:
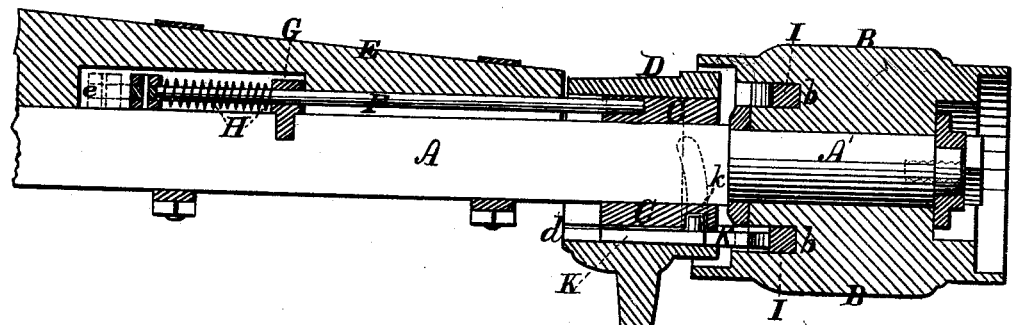

Figure 1 is a perspective view of the front side of an axle, having attached thereto my improved apparatus. Fig. 2 is a like view of the rear side of the same. Fig. 3 is a perspective view of the rear side of said axle, the hub and journaled collar being broken away and the wooden portion of the axle removed to show the interior construction; and Fig. 4 is a vertical longitudinal section of said parts upon a central line.

Letters of like name and kind refer to like parts in each of the figures.

The design of my invention is to enable horses to be fastened while standing, without the aid of hitching-posts, weights, or other appliances ordinarily used; and to this end it consists, principally, in the means employed for causing a sliding collar to engage with the hub, substantially as and for the purpose hereinafter shown.

It consists, further, in the means employed for releasing said collar from engagement with said hub when the former has rotated as far as is required, substantially as and for the purpose hereinafter set forth.

It consists, finally, in the means employed for connecting the reins to or with the rotating collar, substantially as and for the purpose hereinafter shown and described.

In the annexed drawings, A represents a square metal axle, provided at each end with an axle-arm, A', upon which is journaled a wheel-hub, B, all of usual construction. Immediately adjacent to the inner end of the hub B a sleeve, C, is fitted loosely upon the axle A, and arranged to move lengthwise of the same for a short distance without being capable of rotation thereon. The exterior of the sleeve C is cylindrical, and upon the same is loosely fitted a collar, D, which is capable of a rotary motion, but longitudinally is held in position by the inner end of the hub B and the wooden portion E of the axle. The sleeve C is moved lengthwise of the axle A by means of a rod, F, which is contained within a suitable groove, $e$, in the wooden portion E, and at its rear end is provided with a rearward projecting spur, $f$, that enables said rod to be operated. Near its rear end said rod passes through a guide, G, and between said guide and a collar, $f'$, at said rear end is placed a spring, H, which operates to hold said rod and sleeve at the rear limit of their motion, except when the parts are purposely moved in an opposite direction. Within a suitable groove, $b$, which is formed in the inner end of the hub B, is secured an annular metal ring, I, that is provided upon its outer face with ratchet-teeth $i$, which rake forward or in a direction in a line with the motion of said hub when the carriage is moving forward. Within the inner periphery of the collar D is provided a longitudinal groove, that receives and contains a pawl, K, which, at its outer end, is formed upon an oblique line that coincides with the line of the contiguous tooth $i$ of the ring I, so that when said pawl (which is loosely fitted within said groove) is moved outward, its outer end will engage with said ring and lock the same and said collar together, and cause the forward motion of the hub B to be communicated to the latter.

Upon the inner face of the pawl K is provided a stud, $k$, which fits into an annular groove, $c$, that is provided within the periphery of the sleeve C, so that the longitudinal movement of the latter will be communicated to the former, and the engagement with or disengagement from the toothed ring I of said pawl will be effected.

Upon one side of the collar D is provided a radial arm, $d'$, which, when said collar occupies its normal position, extends forward and slightly downward, and has secured to its end one end of a cord or chain, L, that from thence extends forward to and is connected with a bar, M, near its longitudinal center, which bar is hinged at its rear end to or upon the lower side of the shaft N, and by means of a suitable spring is caused to maintain a position in a line with the same, as shown by the full lines of Fig. 1, except when moved therefrom, as will be hereinafter explained.

From the forward end of the hinged bar M a rein is extended to and connected with the bit of the horse, after which, when it is desired to have said horse stand without attention, the sleeve C is moved outward, so as to cause the pawl K to engage with the toothed ring I.

As thus arranged no strain will be thrown upon the bit of the horse while he remains quiet; but should he start forward the collar D will move with the wheel-hub B, and, through the arm $d'$, cord L, bar M, and the line extending from the latter to the bit, will draw upon the latter with constantly-increasing force until the horse is compelled to stop.

Should the horse continue to move forward after all the strain which is safe has been thrown upon the bit, it will be desirable to continue the pressure without further increase, for which purpose the groove $c$ of the collar C curves away from the hub B, as shown in Fig. 3, near its rear end, and causes the pawl K to be withdrawn from engagement with the toothed ring I whenever the collar D has rotated to the desired distance. The further forward motion of the carriage will now cause the pawl to jump from tooth to tooth; but the position of the collar and the tension of the rein will be substantially maintained until the horse has not only stopped, but has moved backward sufficiently to restore said collar to its normal position.

It is intended that there shall be one of the appliances described upon each side of the carriage, and that each shall be connected with one side of the bit, so that if the horse attempts to turn to the right or left the greater space moved over by the outer wheel will cause more pressure to be exerted upon the corresponding side of said bit than upon the opposite side, and the said movement promptly checked. For the purpose of preventing the collar D from rotating rearward from its normal position when the carriage is moved backward, either the pawl K, or some of the mechanism for holding the same in contact with the toothed ring, is provided with a spring-connection, so as to render the pressure yielding, and permit the bevel of the outer end of said pawl and of the teeth $i$ to force the former rearward when moved in the direction named.

Having thus fully set forth the nature and merits of my invention, what I claim as new is—

1. In combination with the collar D, capable of partial rotation around the axle A, the sleeve C, provided with the groove $c$, and arranged to move lengthwise of said axle within said collar, the toothed ring I, secured upon the inner end of the hub, and the pawl K, fitted within a groove, $d$, in said collar, provided with a stud, $k'$, which fits into the said groove $c$ of said sleeve, and capable of engagement with said toothed ring, substantially as and for the purpose shown.

2. The combination of the sleeve C, provided exteriorly with the rearward-curving circumferential groove $c$, the collar D, having the longitudinal groove $d$ within its inner surface, and the pawl K, fitted within said groove $d$, and provided with a stud, $k'$, which engages with said curved groove $c$, substantially as and for the purpose set forth.

3. In combination with the arm $d'$ of the rotating collar D, the bar M, hinged to or upon the shaft N, and held in place by spring-pressure, the cord L, connecting said arm and bar and the rein O, passing between the latter and the bit of the horse, substantially as and for the purpose shown and described.

In testimony that I claim the foregoing I have hereunto set my hand this 23d day of November, 1876.

LEONARD VAUGHAN.

Witnesses:
GEO. S. PRINDLE,
WILLIAM FITCH.